(12) United States Patent
Ramaswamy et al.

(10) Patent No.: US 6,622,119 B1
(45) Date of Patent: Sep. 16, 2003

(54) ADAPTIVE COMMAND PREDICTOR AND METHOD FOR A NATURAL LANGUAGE DIALOG SYSTEM

(75) Inventors: Ganesh N. Ramaswamy, Ossining, NY (US); Jan Kleindienst, Kladno-Krochehlavy (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,034

(22) Filed: Oct. 30, 1999

(51) Int. Cl.[7] .......................... G06F 17/27; G10L 15/14
(52) U.S. Cl. .................................. 704/9; 704/275
(58) Field of Search ....................... 704/1, 9, 10, 257, 704/270, 275; 707/531, 532, 533; 706/47, 49, 53, 54.55

(56) References Cited

U.S. PATENT DOCUMENTS

| | | | | |
|---|---|---|---|---|
| 5,239,617 A | * | 8/1993 | Gardner et al. ............... 706/47 |
| 5,255,386 A | * | 10/1993 | Prager ......................... 706/47 |
| 5,485,544 A | * | 1/1996 | Nonaka et al. ............... 395/12 |
| 5,694,558 A | * | 12/1997 | Sparks et al. ............... 345/326 |
| 5,748,974 A | * | 5/1998 | Johnson et al. ............... 704/1 |
| 5,983,200 A | * | 11/1999 | Slotznick .................... 705/26 |
| 5,999,904 A | * | 12/1999 | Brown et al. ............... 704/272 |
| 6,035,275 A | * | 3/2000 | Brode et al. ............... 704/275 |
| 6,044,347 A | * | 3/2000 | Abella et al. ............... 704/272 |
| 6,073,102 A | * | 6/2000 | Block ......................... 704/275 |
| 6,108,640 A | * | 8/2000 | Slotznick .................... 705/26 |
| 6,308,157 B1 | * | 10/2001 | Vanbuskirk et al. ........ 704/275 |

OTHER PUBLICATIONS

Ramaswamy et al., "A Pervasive Conversational Interface for Information Interaction," Eurospeech 99, Budapest, Hungary, Sep. 1999.
Epstein et al., "Statistical Natural Language Understanding Using Hidden Clumpings," IEEE ICASSP Proceedings, vol. 1, pp. 176–179, May 1996.

* cited by examiner

*Primary Examiner*—Patrick N. Edouard
(74) *Attorney, Agent, or Firm*—F. Chau & Associates, LLP

(57) ABSTRACT

A command prediction system for natural language understanding systems, in accordance with the present invention, includes a user interface for receiving commands from a user. A command predictor receives the commands from the user interface and predicts at least one next command which is likely to be presented by the user based on a command history. A probability calculator is included in the command predictor for determining a probability for each of the at least one next command based on the command history such that a list of predicted commands and their likelihood of being a next command are provided.

21 Claims, 4 Drawing Sheets

ADAPTIVE COMMAND PREDICTOR AND METHOD FOR A NATURAL LANGUAGE DIALOG SYSTEM

BACKGROUND OF THE INVENTION

1. Field of the Invention

The present invention relates to natural language understanding and dialog management systems, and more particularly to a method and system for predicting the users next command for these systems.

2. Description of the Related Art

State-of-the-art natural language dialog systems typically attempt to translate the users input to a formal command by treating each input as an isolated input, without considering the prior history of interaction, without using the knowledge of a given user's standard working habits, and without considering the input device and modality used to access the system. Incorrect responses of a dialog system may be rooted in incorrect contextual understanding of the command provided by a user.

Therefore a need exists for a system and method which takes advantage of a user's exhibited regularities in their interaction with a given system. A further need exists for a system and method which employs the knowledge of a user's regularities to improve the accuracy of the natural language understanding, and to permit the system to take initiative in suggesting the next possible input, thus saving the user additional effort. A still further need exists for a system and method for predicting the next set of commands which will be given by a user in a natural language dialog system.

SUMMARY OF THE INVENTION

A command prediction system for natural language understanding systems, in accordance with the present invention, includes a user interface for receiving commands from a user. A command predictor receives the commands from the user interface and predicts at least one next command which is likely to be presented by the user based on a command history. A probability calculator is included in the command predictor for determining a probability for each of the at least one next command based on the command history such that a list of predicted commands and their likelihood of being a next command are provided.

In alternate embodiments, a natural language engine may be coupled to the user interface for converting commands from the user to formal language commands. The natural language engine may employ the list of predicted commands to weight the commands to provide a most likely next command for execution. A dialog manager may be coupled to the command predictor for prompting a user for a response based on a most probable next command from the list of predicted commands. The user interface may be adapted to receive an access method of the user, and the command predictor may include a prediction model for storing frequencies of issued command sequences and the access method to predicting the at least one next command. The prediction model may include a personal prediction model which is constructed for a given user based on previously issued commands and access methods. The command history preferably stores at least two commands previously issued in one of a same session and a predetermined time interval.

A command prediction system includes a natural language understanding engine coupled to a user interface for receiving commands from a user and converting the commands to formal language commands. A command predictor is included for receiving the formal language commands from the natural language engine and for predicting at least one next command which is likely to be presented by the user. A dialog manager is coupled to the command predictor and the user interface for prompting user action responsive to the predicted at least one next command.

The command predictor preferably includes a command history for storing commands employed by the user. The command predictor may include a prediction model which stores frequencies of command sequences and access methods associated with the command sequences used to predict the at least one next command. The command predictor may include a probability calculator coupled to the command history and the prediction model. The probability calculator may determine a list of predicted commands and associated probabilities of a likelihood of being the next command based on input from the command history and the prediction model. The prediction model may include a personal prediction model for a given user, and the personal prediction model may be constructed from a personal training corpus and based on a command history of the given user.

A method for predicting a next command in a natural language understanding system includes the steps of receiving commands from a user by employing a user interface, receiving the commands from the user interface at a command predictor, the command predictor predicting at least one next command which is likely to be presented by the user based on a command history and determining a probability for each of the at least one next command based on the command history such that a list of predicted commands and their likelihood of being a next command are provided.

In other methods, the step of converting commands from the user to formal language commands by employing a natural language engine may be included. The step of weighting the list of predicted commands to provide a most likely next command for execution may be included. The step of prompting a user for a response based on a most probable next command from the list of predicted commands by employing a dialog manager may be included. The command predictor may include a prediction model and the method may include the step of receiving an access method of the user such that the prediction model employs frequencies of issued command sequences and the access method for predicting the at least one next command. The prediction model may include a personal prediction model and the method may include the step of constructing the personal prediction model for a given user based on previously issued commands and access methods. The methods set forth may be implemented by employing a program storage device readable by machine, tangibly embodying a program of instructions executable by the machine to perform the method steps for predicting a next command in a natural language understanding system.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
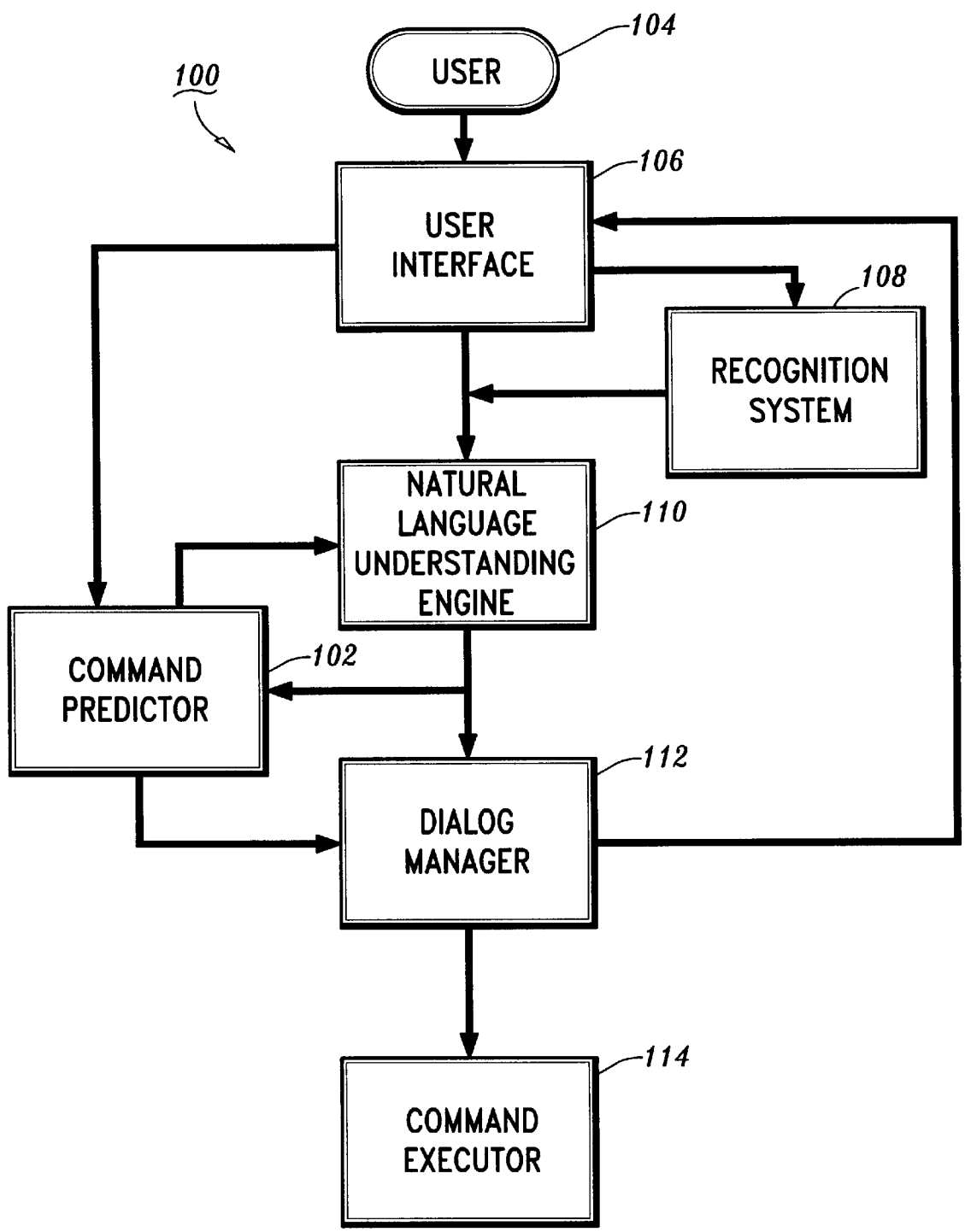
FIG. 1 is a block/flow diagram of a natural language dialog system and method which includes a command predictor in accordance with the present invention.

The present invention provides a system and method for predicting a user's next command or commands in a natural language understanding system. The invention employs available information, such as, a history of interaction between the user and the system, the access method used to interact with the system, and other available information. The prediction of a next command may be used to improve the accuracy and speed of the natural understanding system and permit the system to take initiative to prompt the user with one or more predicted commands. The present invention also describes methods for collecting data on command sequences employed by a given user to adapt prediction models to that user.

A user's interaction with dialog systems often exhibits regularities. Such regularities may include a set commands often executed in sequence, a combination of commands used to complete a particular task, or simply a set of favorite commands. Further, when the system permits for multiple input modalities (typed text, mouse clicks, spoken input, handwritten input, gestures, etc.) or access from multiple devices (desktop computer, telephone, personal digital assistant, etc.), then additional regularities may also be executed, such as a preference for certain commands when a particular input modality or a particular input device is used.

If the regularities exhibited by the user are captured using a statistical model, then the model may be used to improve the accuracy of the natural language understanding process used to interpret the user input. Consider, for example, a natural language dialog system for interacting with an electronic mail application. A user may create a new message, and will likely either ask for the message to be sent, or to be saved. The system can predict the most probable choices, and give higher priority to the "send" and "save" commands that are likely to follow and when the user subsequently presents one of these two inputs, the input can be interpreted more accurately.

The knowledge of the likely subsequent commands can also be used to incorporate system initiative, where the system suggests the next input to the user. For instance, in the above example, after the user completes the creation of a new message, the system may prompt the user with a question such as "would you like to send this message," for which the user only needs to say "yes" if in fact that was the users next intention, or a "no" otherwise. Answers such as "yes" or "no" are not only easier for the user to say, but are also easier for the system to understand, and therefore will result in a higher degree of user satisfaction. One other application of the command prediction is to restrict the search space for the commands during natural language understanding, by selecting only a predetermined number of top-ranking commands as candidates, and thereby reducing the computational complexity involved in translating the user input to a formal command.

It should be understood that the elements shown in FIGS. 1–4 may be implemented in various forms of hardware, software or combinations thereof. Preferably, these elements are preferably implemented in software on one or more appropriately programmed general purpose digital computers having a processor and memory and input/output interfaces. Referring now to the drawings in which like numerals represent the same or similar elements and initially to FIG. 1, a block diagram of an illustrative natural language dialog system 100 is shown. System 100 includes a command predictor 102. A user 104 submits a command input through a user interface 106. The user input may be in one of many different modalities, such as spoken input, handwritten input, gestures, typed text, other keyboard and mouse actions. The input may be originated from one of many different devices, such as a desktop computer, a telephone, a personal digital assistant, a two-way pager, etc. Inputs that need translation to text form, such as spoken or handwritten inputs, are submitted to a recognition engine 108, which converts the input to text form. Methods for speech recognition and handwriting recognition are known in the art. The text input is then submitted to the natural language understanding (NLU) engine 110, which converts the input text to a formal command, suitable for execution by a command executor 114, for example, a computer.

In the example of an electronic mail application described above, if the user input is "do I have any new messages?" the corresponding formal command may be: checkNewMail( ). The formal command from NLU engine 110 is submitted to a dialog manager 112, to be processed for execution, and also to command predictor 102, for predicting the users next command. The dialog manager 112 resolves any ambiguities that may be present in the formal command, and submits the formal command to the command executor 114 for execution of the command.

In addition to the actual commands, the input modality and input device used to submit the input are also sent to the command predictor 102 by the user interface 106. The command predictor 102 uses both the knowledge of previously issued commands, as well as the input modality and input device information to predict the users next command. In addition to the history of the previously issued commands, the input modality and the input device information are also very useful in predicting the users next command. For example, if the user is connected through a telephone, where there is no display, the user is highly unlikely to issue a display related command such as close this window, or open the next message, but is more likely to say play the next message. Hereinafter, the combination of input mode and input device will be referred to as access method. In one embodiment NLU engine 110 and dialog manager 112 are provided as described in G. Ramaswamy, et al., "A pervasive conversational system for information interaction," Eurospeech '99, Budapest, Hungary, September 1999, incorporated herein by reference. User interface 106 may include a display or graphical interface, a speech interface, touch tone, etc. according to the device and mode employed by the user.

Figure 2:
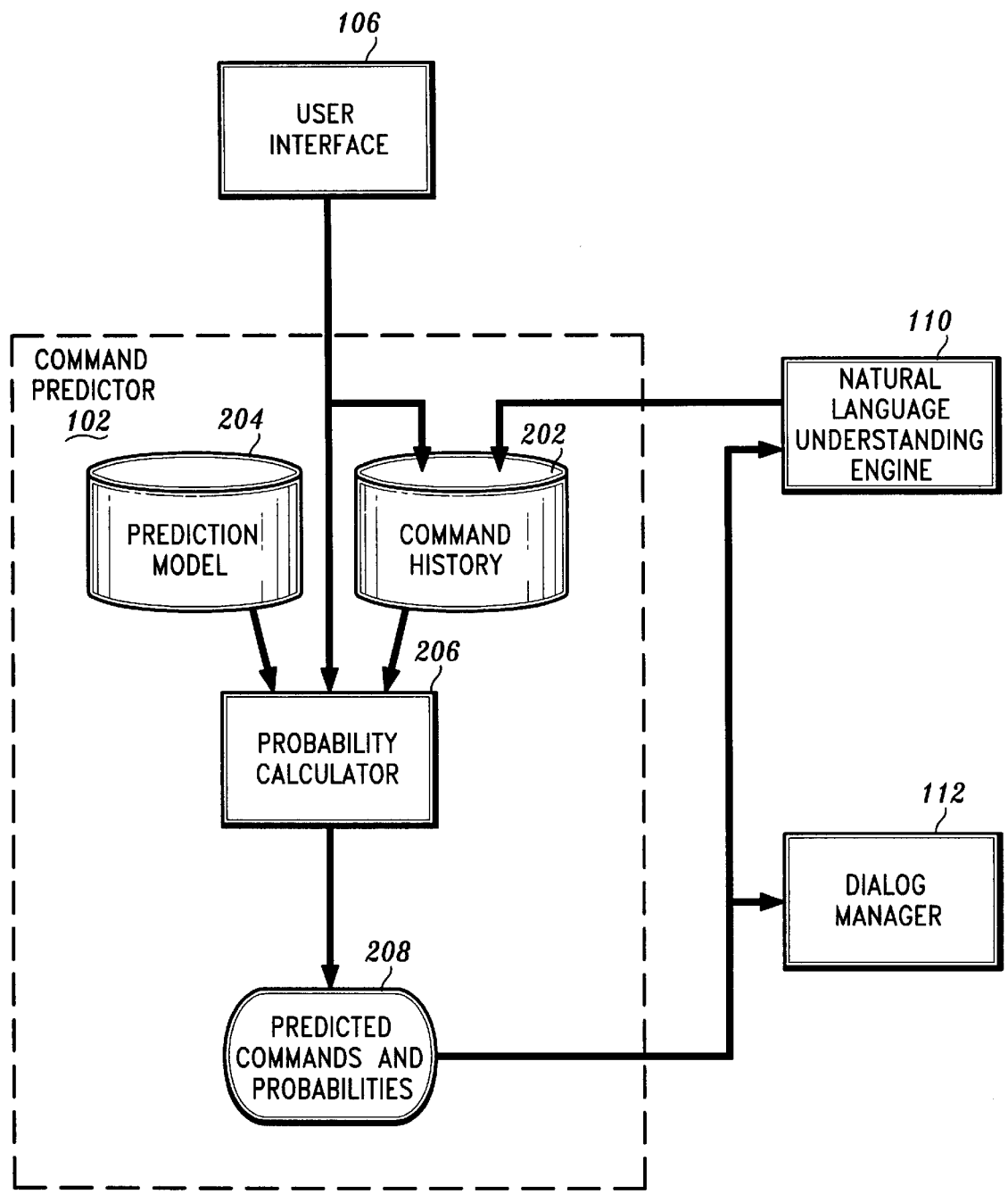
FIG. 2 is a block/flow diagram of a command predictor or method of command prediction in accordance with the present invention.

Referring to FIG. 2, a block diagram of an illustrative command predictor 102 is shown in accordance with the present invention. A command history 202 stores the commands issued by the user, along with access methods. The commands come either from the NLU engine 110 (for inputs that need conversion to formal commands, such as speech, handwriting or typed text inputs) or directly from the user interface 106 (for inputs that do not need conversion to a formal command, such as a mouse click). The user interface 106 is also responsible for providing the identity of the access method for each input to the command history 202, as well as to a probability calculator 206. The access method may identify the type of device employed for communication as well as other information, for example, a specific device identity and/or its mode of use. For example, devices, such as a desktop computer, may include several modes of use, for example, speech, keyboard, mouse, etc.

The probability calculator 206 uses the command history 202, the current access method, and a prediction model 204 to calculate the conditional probability for each formal command, given the history and current access method.

If a formal command to be chosen at time t is denoted as $F_t$, and the current access method at time t is denoted to be $M_t$, then the probability calculator 206 computes the conditional probability $$P(F_t|F_{t-1}, F_{t-2}, \ldots, F_1, M_t) \quad (1)$$

for all formal commands. Here the set $(F_{t-1}, F_{t-2}, \ldots, F_1)$ represents an example of the contents of the command history 202, including all of the previously chosen formal commands in a given session or over a given time period. The conditional probability of equation (1) is calculated for all formal commands in system 100, and the formal commands are ranked according to their corresponding conditional probability, with the most probable formal command appearing at the top of a list 208. The list 208 including the ranked formal commands and their associated probabilities is presented to the NLU engine 110, and to the dialog manager 112.

The dialog manager 112 may use the first formal command as the suggested next action and present the formal command to the user via the user interface 106. To accept the suggested command, the user only has to say "yes," or an equivalent natural language phrase, rather than the full command. To reject the first suggested command, the user may say "no" or an equivalent natural language phrase, and either state the intended next command, or wait for the dialog manager to suggest the second command from the predicted list 208. The process continues until all the top-ranking formal commands from the predicted list are exhausted, or until the user states the desired next command. The number of commands to suggest, i.e., the number of ranked predicted commands in the list 208, is a system parameter that may be set by the user.

The manner in which the conditional probabilities are used by the NLU engine 110 depends on the type of NLU engine that is used. There are many methods known in the art for building NLU engines, such as the one described in M. Epstein et al., "Statistical Natural Language Understanding Using Hidden Clumpings," IEEE ICASSP Proceedings, Vol. 1, pp. 176–179, May 1996, incorporated herein by reference. As noted earlier, state-of-the-art NLU engines do not typically consider the command history and access method information, and attempt to translate a given user input S to a formal command F in isolation. The formulation often used is to find the formal command $F_t$ for a given input $S_t$ at time t is given by $$F_t = \text{argmax}_F(P(F)P(S_t|F)) \quad (2)$$

where argmax( ) determines a best ranked value for F.

Here $P(S_t|F)$ comes from a translation model built using a large amount of training data. An example of how to build this model is described in Epstein et al., referenced above. The quantity P(F) is the prior probability for a given formal command F, and is usually assumed to be uniform. That is, P(F) is set to a constant for all F.

The present invention provides a method to use command history and access method information for NLU engines that are built on the basis of equation (2). Conditional probability in accordance with equation (1) may be employed instead of the uniform model P(F) in equation (2), so that the formal command $F_t$ may be selected for a given input $S_t$ according to:

$$F_t = \text{argmax}_F(P(F|F_{t-1}, F_{t-2}, \ldots, F_1, M_t)P(S_t|F)) \quad (3)$$

With this formulation, formal commands that are considered more likely, given the command history and access method information, are given higher weights, and the commands that are less likely are given lower weights, rather than the simple uniform weight given by P(F). Using equation (3) instead of equation (2) will advantageously improve the accuracy of the NLU engine 110.

Even for NLU engines that do not work on the basis of equation (2), command prediction is still useful. The conditional probabilities from equation (1) may be used to weight the scores that would otherwise come from the NLU engine, by giving more importance to the top-ranking commands, or a predetermined number of top ranking commands may be used limit the search space for the formal commands. With this application, the NLU engine 110 translation will not only be more accurate, but will also result in lower computational complexity since now the search for the best formal command is limited to a small set, rather than the full set of all formal commands.

Computation of the conditional probability in equation (1) needs a prediction model 204 to be constructed. In building the prediction model 204, the size of the command history to be used is determined first. In practice, it is not beneficial to consider the entire history since commands issued several time periods earlier are probably not very useful in predicting the command at the current instance. Depending on the method used to model and calculate the conditional probability in equation (1), the command history may be truncated to just a few of the previously issued commands. In one embodiment of the invention, only the two previous formal commands are considered, and the expression of equation (1) may be rewritten as $$P(F_t|F_{t-1}, F_{t-2}, M_t) \quad (4)$$

for t>2. For t=2 and t=1, the commands, $F_0$ and $F_1$, will be set to a null command called the boundary command, which signifies the beginning of the session.

Figure 3:
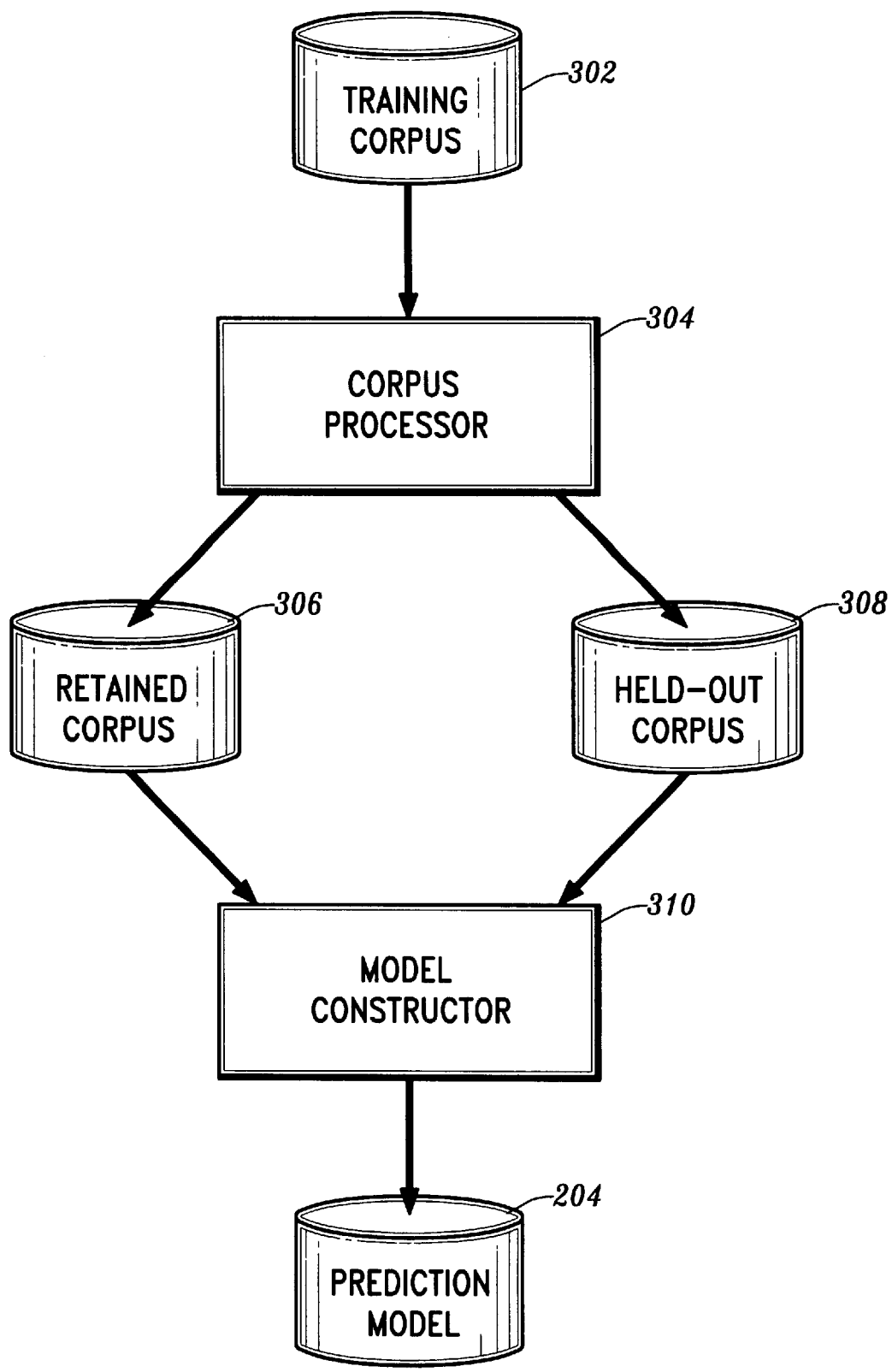
FIG. 3 is a block/flow diagram illustratively showing the construction of a prediction model in accordance with the present invention.

In one embodiment of the invention, the prediction model 204 is constructed using methods similar to the construction of trigram language models in speech recognition (See, for example, *Statistical Methods for Speech Recognition*, by F. Jelinek, MIT Press, 1998.) Referring to FIG. 3, a block/flow diagram illustratively shows the construction of a prediction model 204. A training corpus 302 is constructed, which preferably includes a large number of formal commands from a large number of users. A sequence of the issuance of the commands and the access method used to issue the commands are recorded and segmented into different sessions of user-system interaction. The training corpus 302 is processed by a corpus processor 304, which separates each session into different files, and inserts boundary commands at the beginning of each session to indicate the beginning of each session. The presence of the boundary commands ensures accurate predictions for the first and second command in a given session.

Using the trigram modeling approach, $P(F_t|F_{t-1}, F_{t-2}, M_t)$ may be calculated using $$P(F_t \mid F_{t-1}, F_{t-2}, M_t) = g(F_t \mid F_{t-1}, F_{t-2}, M_t) = \frac{C(F_t, F_{t2}, F_2, M_t)}{C(F_{t-1}, F_{t-2}, M_t)} \quad (5)$$

where the function g(|) is a relative frequency function, and $C(F_t|F_{t-1}, F_{t-2}, M_t)$ is the total number of times the sequence of commands $(F_t, F_{t-1}, F_{t-2})$ was observed for access method $M_t$. Therefore, building the prediction model may be done simply by counting the relative frequencies of all observed sequences of command in the training corpus 302.

Although equation (5) will provide accurate values for the conditional probability in an ideal setting with infinite amount of training data, in practice, it may be necessary to perform certain approximations for the purpose of smoothing the probability distribution. This is primarily due to the fact that certain combinations of $(F_t, F_{t-1}, F_{t-2}, M_t)$ may be issued by the user during usage, but may not be present in the training corpus 302. One way to accomplish the smoothing is to rewrite equation (5) as $$P(F_t|F_{t-1}, F_{t-2}, M_t) = \lambda_3 g(F_t|F_{t-1}, F_{t-2}, M_t) + \lambda_2 g(F_t|F_{t-1}, M_t) + \lambda_1 g(F_t|M_t) \quad (6)$$

where the weights $\lambda_i$'s satisfy $\lambda_1 + \lambda_2 + \lambda_3 = 1$. With this modification, note that if the sequence $(F_t, F_{t-1}, F_{t-2})$ is not present in the training corpus for access method $M_t$, but the sequence $(F_t, F_t 31\ 1)$ is present for that access method, then the conditional probability in equation (6) may be non-zero. Even if the sequence $(F_t, F_{t-1})$ is not present with access method $M_t$, but the command $F_t$ is issued at least once with the access method in the training corpus, the conditional probability in equation (6) may be non-zero.

However, if the command $F_t$ has never been used with the access method $M_t$ in the training corpus, then the conditional probability in equation (6) will be zero. For example, if the user is accessing the system using a telephone, which is a speech-only device, then commands related to graphical actions (such as opening a message window) are not likely to be issued, and in this case, the conditional probability for a graphical command may be zero. This is actually a very desirable result, since formal commands not related to a particular access method are eliminated automatically from consideration, which not only improves the accuracy of the system, but also reduces the search space for the formal commands, thereby also reducing the computational complexity of the system.

To calculate the weights ($\lambda_i$'s) in equation (6), the training corpus 204 may be divided into a retained corpus 306 and a held-out corpus 308. The held-out corpus 308 may include about 10–15% of the data in the training corpus 302, including complete sessions. The retained corpus 306 may include all the remaining data, and is used to calculate the relative frequencies g( ) in equation (6). The held-out corpus 308 is used to calculate values for the $\lambda_i$'s in equation (6), such that the likelihood of the data in the held-out corpus 308 is maximized when computed using equation (6). One algorithm that may be used to calculate the $\lambda_i$'s is the estimation algorithm for deleted interpolation which is described by F. Jelinek in the above referenced book.

The corpus processor 304 separates each session into different files, and inserts boundary commands at the beginning of each session to indicate the beginning of each session, and creates the retained corpus 306 and the held-out corpus 308. The presence of the boundary commands is needed to ensure accurate predictions for the first and second command in a given session. The retained corpus 306 and the held-out corpus are used by a model constructor 310 to compute the relative frequencies g( ) and the weights $\lambda_i$'s in equation (6) and these parameters are stored in the prediction model 204.

Returning to FIG. 2, the probability calculator 206 receives the identity of $F_{t-1}$ and $F_{t-2}$ from the command history, and the identity of $M_t$ from the user interface, and computes the conditional probability using equation (6) by employing the relative frequencies g( ) and the weights $\lambda$ from the prediction model. The conditional probability for equation (6) is calculated for each formal command in the system, and the formal commands are ranked according to their probability, with the most probable command appearing first. Formal commands with zero probability (or alternatively, the probability below a predetermined threshold) are removed from the list, and the remaining list is presented to the dialog manager 112 and the natural language understanding engine 110, as described earlier. The prediction model 204 in FIG. 3 is constructed using the training corpus 302 from a large number of users, and therefore will work well for the average user. However, as a given user continues to use the system, additional data is generated, and additional data can be used to personalize the prediction model 204, such that the system will predict commands with even greater accuracy for that particular user.

Figure 4:
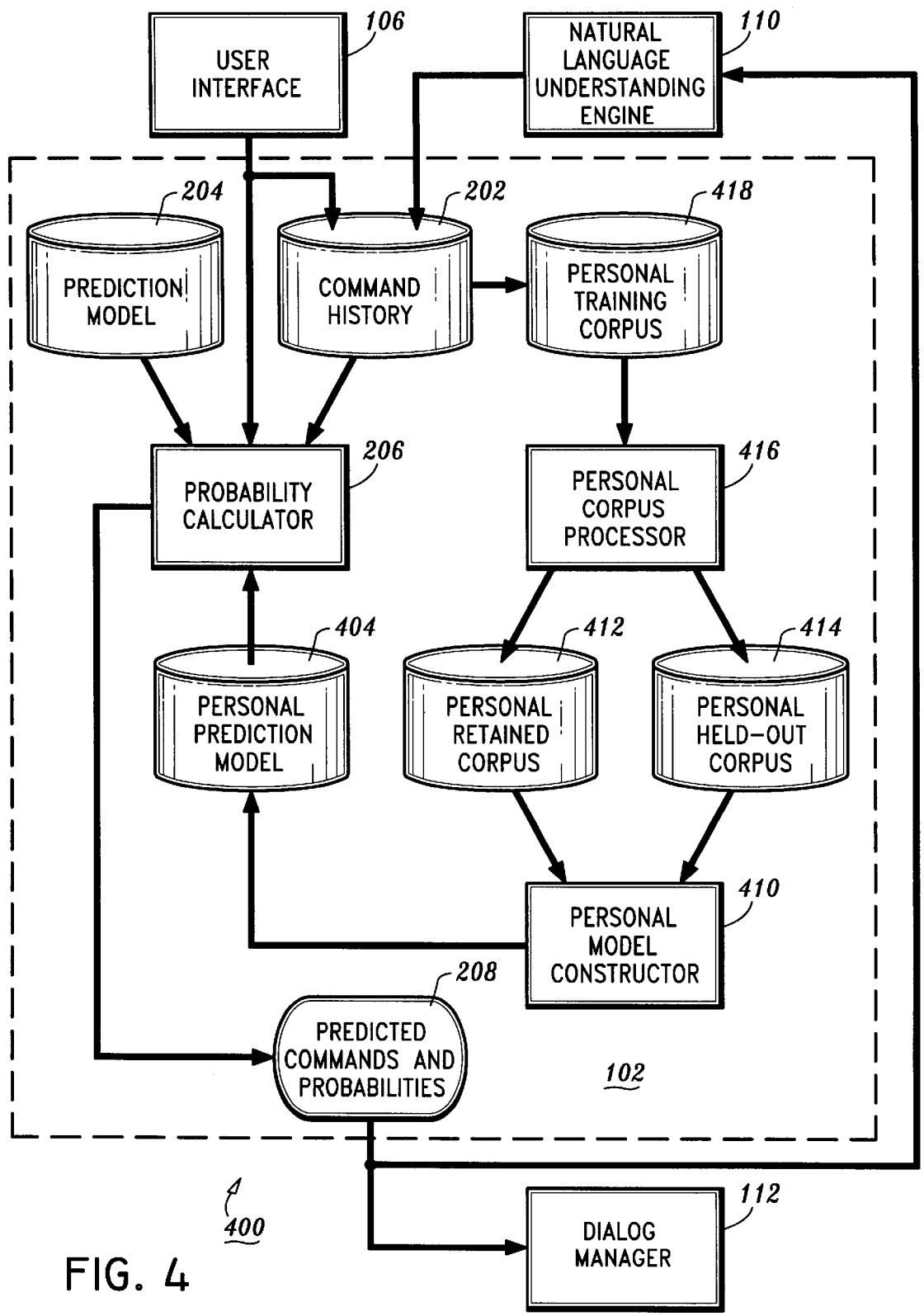
FIG. 4 is a block/flow diagram illustratively showing the construction of a personal prediction model in accordance with the present invention.

Referring to FIG. 4, a block/flow diagram illustratively shows the construction of a personal prediction model 402 by employing a command predicting system 400 in accordance with the invention. A new user starts using the system 400 with the prediction model 204 from FIG. 3. Every time the user issues a command, the resulting formal command and the access method used, both of which are recorded in the command history 202, are also written to a personal training corpus 418. The personal training corpus 418 continues to accumulate the data, and when there is sufficient data to construct a new model, the data is presented to a personal corpus processor 416. The personal corpus processor 416 is functionally equivalent to the corpus processor 304 in FIG. 3. The personal corpus processor 416 separates each session into different files, and inserts boundary commands at the beginning of each session to indicate the beginning of each session, and creates a personal retained corpus 412 and a personal held-out corpus 414. The personal retained corpus 412 and held-out corpus 414 are used by a personal model constructor 410, which is functionally equivalent to the model constructor 310 in FIG. 3, to construct a personal prediction model 404. The personal prediction model 404 is used to calculate the conditional probability $P^p(\ )$ given the history and access method, for a particular user, which may be written as:

$$P^p(F_t|F_{t-1}, F_{t-2}, M_t) = \lambda_3^p g^p(F_t|F_{t-1}, F_{t-2}, M_t) + \lambda_2^p g^p(F_t|F_{t-1}, M_t) + \lambda_i^p g^p(F_t|M_t) \quad (7)$$

The personal retained corpus 412 is used to calculate the relative frequencies $g^p(\ )$, and the personal held-out corpus 414 is used to calculate the weights $\lambda_p{}^i$'s, using procedures similar to the construction of the prediction model 204 in FIG. 3, and these are stored in the personal prediction model 404.

The probability calculator 206 in FIG. 4 calculates the conditional probability using equation (6), which will now be denoted as the average conditional probability $P^a(\ )$, because it is computed from the training corpus 418 including data from a large number of users, rewritten below as:

$$P^a(F_t|F_{t-1}, F_{t-2}, M_t) = \lambda_3^a g^a(F_t|F_{t-1}, F_{t-2}, M_t) + \lambda_2^a g^a(F_t|F_{t-1}, M_t) + \lambda_1^a g^a(F_t|M_t) \quad (8)$$

In equation (8), the relative frequencies g( ) from equation (6) are denoted as $g^a(\ )$ and the weights $\lambda$ are denoted as $\lambda^a$ for clarity. Then, the probability calculator 206 computes the personal conditional probability $P^p(\ )$ given by equation (7). The average and personal conditional probabilities are then mixed to create the resulting final conditional probability $P(\ )$, which may be written as:

$$P(F_t|F_{t-1}, F_{t-2}, M_t) = \beta_a P^a(F_t|F_{t-1}, F_{t-2}, M_t) + \beta_p P^p(F_t|F_{t-1}, F_{t-2}, M_t) \quad (9)$$

The mixture coefficients $\beta_a$ and $\beta_p$ satisfy the constraints $\beta_a + \beta_p = 1$. Initially, when there is only a small amount of data in the personal training corpus 418, the personal prediction model 404 will not be as reliable as when there is a large amount of data, and therefore $\beta_p$ should be set to a small value, for example 0.01. As the user continues to use the system, the personal training corpus will become larger and improved personal prediction models may be constructed periodically. As the personal training corpus 418 becomes larger, $\beta_p$ may be increased to larger values, and the prediction will become more personalized to the given user, and the accuracy of the command predictor will improve. $\beta_p$ may be automatically updated by the system based on the size of the personal training corpus 418. Formal commands that are frequently used by the given user will be predicted more accurately, and the commands not used by the user will be de-emphasized or dropped all together, which is a very desirable feature since the full set of formal commands will include a large number of formal commands, not all of which are relevant to every user. The command predictor 102 can adapt the set of formal commands to a given user, thereby providing higher accuracy with lower computations, which will result in greater satisfaction to the user.

Having described preferred embodiments of an adaptive command predictor and method for a natural language dialog system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A command prediction system for natural language understanding systems comprising:
   a user interface for receiving commands from a user;
   a command predictor for receiving the commands from the user interface and predicting at least one next command which is likely to be presented by the user based on a command history;
   a probability calculator being included in the command predictor for determining a probability for each of the at least one next command based on the command history such that a list of predicted commands and their likelihood of being a next command are provided; and
   a natural language engine for processing the list of predicted commands and associated probabilities to convert a command from the user to formal language command.

2. The system as recited in claim 1, wherein the natural language engine employs the list of predicted commands to weight the commands to provide a most likely next command for execution.

3. The system as recited in claim 1, further comprising a dialog manager coupled to the command predictor for prompting a user for a response based on a most probable next command from the list of predicted commands.

4. The system as recited in claim 1, wherein the user interface receives an access method of the user, and the command predictor further comprises a prediction model, the prediction model for storing frequencies of issued command sequences and the access method for predicting the at least one next command.

5. The system as recited in claim 4, wherein the prediction model includes a personal prediction model which is constructed for a given user based on previously issued commands and access methods.

6. The system as recited in claim 1, wherein the command history stores at least two commands previously issued in one of a same session and a predetermined time interval.

7. A command prediction system comprising:
   a natural language understanding engine coupled to a user interface for receiving commands from a user and converting the commands to formal language commands;
   a command predictor for receiving the formal language commands from the natural language engine and for predicting at least one next command which is likely to be presented by the user;
   a dialog manager coupled to the command predictor and the user interface for prompting user action responsive to the predicted at least one next command.

8. The system as recited in claim 7, wherein the command predictor includes a command history for storing commands employed by the user.

9. The system as recited in claim 8, wherein the command predictor includes a prediction model which stores frequencies of command sequences and access methods associated with the command sequences used to predict the at least one next command.

10. The system as recited in claim 9, wherein the command predictor includes a probability calculator coupled to the command history and the prediction model, the probability calculator for determining a list of predicted commands and associated probabilities of a likelihood of being the next command based on input from the command history and the prediction model.

11. The system as recited in claim 8, wherein the prediction model includes a personal prediction model for a given user, the personal prediction model being constructed from a personal training corpus and based on a command history of the given user.

12. A method for predicting a next command in a natural language understanding system comprising the steps of:
   receiving commands from a user by employing a user interface;
   receiving the commands from the user interface at a command predictor;
   the command predictor predicting at least one next command which is likely to be presented by the user based on a command history;
   determining a probability for each of the at least one next command based on the command history such that a list of predicted commands and their likelihood of being a next command are provided; and
   processing the list of predicted commands and associated probabilities to convert a command from the user to formal language command using a natural language understanding engine.

13. The method as recited in claim 12, wherein the step of converting includes the step of weighting the list of predicted commands to provide a most likely next command for execution.

14. The method as recited in claim 12, further comprising the step of prompting a user for a response based on a most probable next command from the list of predicted commands by employing a dialog manager coupled.

15. The method as recited in claim 12, wherein the command predictor includes a prediction model and further comprising the step of receiving an access method of the user such that the prediction model employs frequencies of issued command sequences and the access method for predicting the at least one next command.

16. The method as recited in claim 15, wherein the prediction model includes a personal prediction model and further comprising the step of constructing the personal prediction model for a given user based on previously issued commands and access methods.

17. A program storage device readable by machine, tangibly embodying a program of instructions executable by the machine to perform method steps for predicting a next command in a natural language understanding system, the method steps comprising:

receiving commands from a user by employing a user interface;

receiving the commands from the user interface at a command predictor;

the command predictor predicting at least one next command which is likely to be presented by the user based on a command history;

determining a probability for each of the at least one next command based on the command history such that a list of predicted commands and their likelihood of being a next command are provided; and processing the list of predicted commands and associated probabilities to convert a command from the user to formal language command using a natural language understanding engine.

18. The program storage device as recited in claim 17, wherein the step of converting includes the step of weighting the list of predicted commands to provide a most likely next command for execution.

19. The program storage device as recited in claim 17, further comprising the step of prompting a user for a response based on a most probable next command from the list of predicted commands by employing a dialog manager coupled.

20. The program storage device as recited in claim 19, wherein the command predictor includes a prediction model and further comprising the step of receiving an access method of the user such that the prediction model employs frequencies of issued command sequences and the access method for predicting the at least one next command.

21. The program storage device as recited in claim 20, wherein the prediction model includes a personal prediction model and further comprising the step of constructing the personal prediction model for a given user based on previously issued commands and access methods.

\* \* \* \* \*